Jan. 15, 1957 W. B. CRANE 2,777,627
PAPERBOARD SHIPPING CRATE AND INTERLOCKED CRATE UNIT
Filed March 9, 1953 6 Sheets-Sheet 2

INVENTOR.
Walton B. Crane,
BY
Cromwell, Greist & Warden
Attys

INVENTOR.
Walton B. Crane,

Jan. 15, 1957 W. B. CRANE 2,777,627
PAPERBOARD SHIPPING CRATE AND INTERLOCKED CRATE UNIT
Filed March 9, 1953 6 Sheets-Sheet 4

INVENTOR.
Walton B. Crane,
BY
Cromwell, Greist & Warden
Attys

United States Patent Office 2,777,627
Patented Jan. 15, 1957

2,777,627

PAPERBOARD SHIPPING CRATE AND INTERLOCKED CRATE UNIT

Walton B. Crane, Woodland Hills, Calif., assignor to Allied Plastics Company, Los Angeles, Calif., a corporation of California Application March 9, 1953, Serial No. 341,075

12 Claims. (Cl. 229—27)

The present invention relates to improvements in corrugated paperboard crates for shipping fruit, vegetables and other produce, and to different embodiments of a shipping unit composed of a plurality of the improved crates locked together in a compact and stable group by means of novel crate aligning and retaining provisions. With reference to the different forms of individual crates of such a multiple crate unit, the invention presents improved structural features having the effect of considerably strengthening and reinforcing the same; for example, as compared with generally similar crate constructions which are the subject matter of my copending applications, Serial No. 283,837, filed April 23, 1952, and Serial No. 291,473, filed June 3, 1952, now abandoned. Insofar as the shipping unit as a whole is concerned, its improved crate registering and locking means impart rigidity and strength to the stacked paperboard crates far out of proportion to the strength and rigidity of the means themselves, so that the completed assembly has all of the advantages of a strapped wooden assembly, plus lighter weight and lower cost of production.

It is a general object of the present invention to provide a shipping crate unit made up of a plurality of improved corrugated board crates or lugs which are interlocked in a stacked group and, so interlocked, present a light weight unit having rigidity and strength comparable to that found in a wire bound wooden lug, but which can be produced at a fraction of the cost of the latter.

Another object of the invention is to provide an improved paperboard shipping crate or container, preferably of moisture-resistant corrugated board construction, which is partially assembled and shipped to the user in a flat, knocked-down condition, the assembly of the crate being finished by the user in a simple, manually performed operation. The completed container is characterized, in one form, by a stiff, multiple thickness wall about its entire perimeter, by a unitary, seamless bottom integrally connected to its four walls, and by various reinforcing and locking provisions at those walls and at a transverse internal divider or partition which greatly strengthen and further rigidify the container. In another form the container has improved, projecting tab means on its end wall panels to insure proper space, within its multiple panel end walls, for the reception of the stacking and locking members which hold a number of the containers in a stacked group.

Yet another object is to provide a shipping unit made up of a plurality of the improved containers or crates, which are held in rigid vertically stacked and displacement resisting relation by improved and inexpensive stacking and locking members telescoped through vertically registered walls of the crates, the members being readily and quickly applied and locked to the crates. Thereafter they confine the crates positively and securely in the desired unitary assembly, so as to resist damage in shipment over long distances and under adverse weather and handling conditions.

In any of the embodiments thereof, the invention features a shipping unit as described in the preceding paragraphs in which stacked crates have multiple ply end walls including parallel panels which are in slightly spaced relation to one another and are integrally connected at their tops, the top connecting portions being provided with a slot vertically aligned with the space between the panels; through this slot a stack aligning and locking clip or member projects vertically from the end wall of one crate to a crate superposed thereon, the wall panels being provided with simple means for maintaining the proper spacing thereof to accommodate this locking member.

Yet another object is to provide improved crate tie means, illustrated in various different practical forms for thus holding a plurality of crates in compact and rigidly confined order. In certain of the embodiments, such tie means take the form of a bent wire type clip which is engageable from beneath the lowermost crate of a stack of crates and passes upwardly through the slots and wall spaces referred to in the preceding paragraph, being in stabilizing engagement with the end wall panels of each crate to hold the crates against relative longitudinal or transverse shifting in a horizontal plane, this clip being adapted to be bent over the topmost crate to bind the crates in a compact stack.

The foregoing statements are indicative in a general way of the nature of the invention. Other and more specific objects will be apparent to those skilled in the art upon a full understanding of the construction and use of crate and shipping unit.

There are several embodiments of the invention presented herein for purpose of illustration, both relating to the improved crate, per se, to the provisions for assembling a plurality thereof in unitary stacked form for shipping, and to the resultant multiple crate shipping unit. It will be appreciated that the invention may be incorporated in other modified forms coming equally within the scope of the appended claims.

Figure 1:
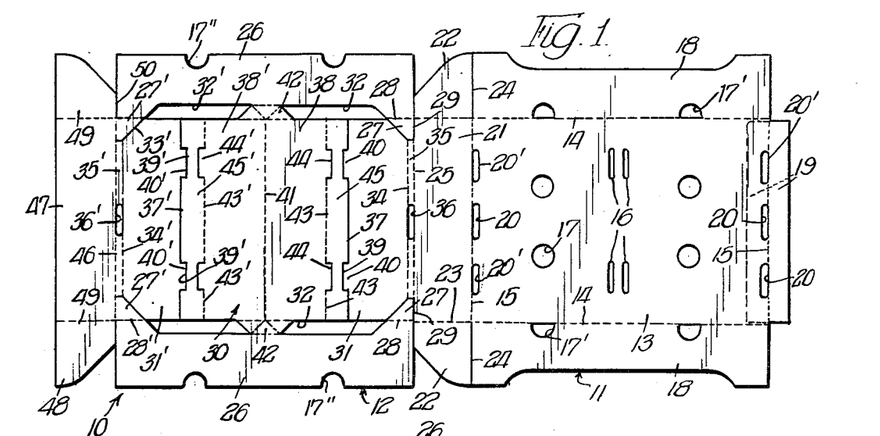
Fig. 1 is a top plan view of a paperboard blank employed in fabricating the improved shipping crate, in one form.

Fig. 1 of the drawings illustrates a flat paperboard blank 10, preferably of corrugated board stock suitably treated to resist moisture, which is died out in an elongated, generally rectangular outline. Blank 10, viewed as in Fig. 1, consists of the right hand wall and bottom forming section 11 and a left hand wall and partition forming section 12.

Section 11 comprises a rectangular bottom forming panel 13 outlined by opposed pairs of longitudinal and transverse creases 14, 15, respectively. Panel 13 is provided on either side of the longitudinal center line thereof with pairs of transversely spaced, transversely elongated partition latching slots 16, and it is also provided with a number of ventilating openings designated 17. Inner side wall panels 18 are integrally hinged to panel 13 by side margin forming creases 14 of the latter, and further ventilating apertures 17' are formed in wall panels 18 adjacent creases 14.

An end wall securing flap 19 of transversely elongated rectangular shape is integrally hinged to the right hand end of bottom panel 13 by one of the creases 15, and a medial, transversely elongated crate registering slot 20 is formed in panel 13 just inwardly of that crease. Slot 20 is flanked by two similarly shaped end wall latching slots 20', similarly located with reference to crease 15. An outer end wall panel 21 of rectangular outline is similarly hinged integrally to the opposite end marginal crease 15 of panel 13, the latter also being provided adjacent this end with slots 20, 20' similar to those at the opposite end thereof. End wall sealing flaps 22, which are adapted to be disposed internally of the completed and erected container, are integrally hinged to opposite ends of panel 21 by means of longitudinal creases 23 paralleling creases 14, but located slightly inwardly thereof in the transverse sense. Transverse slits 24 separate flaps 22 from inner side wall panels 18.

Partition and wall forming section 12 is integrally hinged to end wall panel 21 of section 11 by means of a transverse crease 25. It comprises a pair of opposed outer side wall forming panels 26 integrally connected to the remainder of the section 12 by means of a pair of triangular webs 27. These are outlined by short longitudinal creases 28 almost aligned with but offset slightly inwardly of the creases 23, and by short transverse creases 29 which are, in effect, side extensions of crease 25.

The reference numeral 30 generally designates an inner end wall and partition forming panel unit made up of a set of slit-freed panel sections, as follows: At the right hand of panel unit 30, as viewed in Fig. 1, there is a generally rectangular inner end wall panel 31; this is separated from outer side wall panels 26 and from triangular webs 27 by an elongated, longitudinally extending opening 32 at each side margin of panel unit 30 and by a 45° slit 33 leading from those openings to creases 25. A transverse hinge crease 34 paralleling and closely adjacent crease 25 coacts with the latter in defining a double creased end wall hinge 35 which coincides with the top of an end wall of the completed carrier. A transversely elongated slot 36, longitudinally aligned with the centermost slots 20 of blank section 11, is provided for the purpose of receiving a stack alignment and locking member, to be described.

Inner end wall panel 31 is separated by a transversely extending, shaped slit 37 from a swingable partition forming panel 38. Slit 37 includes two small, inverted U-shaped portions 39 defining transversely spaced locking feet 40 on panel 31, these feet are longitudinally aligned with the respective locking slots 20' in blank section 11.

A second set of partition and end wall forming panels, hinged by a transverse medial crease 41 to the set just described, is provided in unit 30 by slitting and creasing the same in exactly the same manner referred to above. In other words unit 30 is symmetric in shape, and correspondingly treated, on opposite sides of crease 41. Hence corresponding parts, provisions and relationships are designated by corresponding reference numerals, primed, and further description is dispensed with. Partition forming panels 38, 38' are integrally hinged to one another by crease 41 and, moreover, are integrally connected to the respective side wall panels 26 by means of angularly creased gusset sections 42 at each end of the crease. Sections 43 form well braced struts connecting the partition formed by panels 38, 38' to the side walls when the crate is completed and erected. Details in this regard are illustrated and described in my copending applications referred to above, hence are not further enlarged on herein.

Panels 38, 38', at the free swinging ends thereof adjoining the respective slits 37, 37', are provided with series of transversely extending creases 43, 43' interrupted by U-shaped slits to define bottom locking feet 44, 44' for the respective transverse partition panels, similar to feet 40, 40' on panels 31, 31', respectively. Friction holding flaps 45, 45' lie between creases 43, 43' and the respective transverse slits 39, 39' which free the partition panels and inner end wall panels from one another.

Left hand inner end wall panel 31' of unit 30 is connected by a transverse hinge crease 46, similar to crease 25, with an outer end wall forming panel 47. End wall panel 47 has end flaps 48 integrally hinged to opposite ends thereof by short longitudinal creases 49 aligned with creases 23, and flaps 48 are separated from side wall panels 26 by transverse slits 50 aligned with crease 46.

Figure 2:
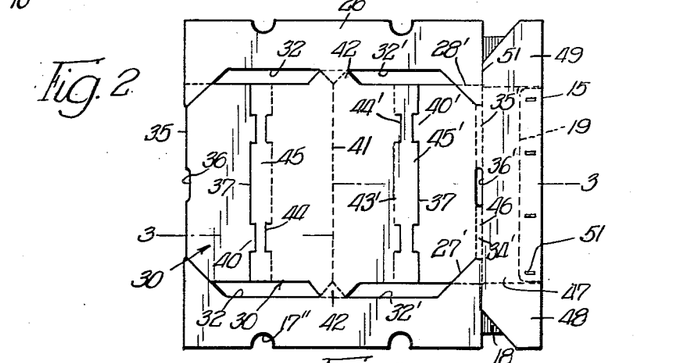
Fig. 2 is a top plan view showing the blank manipulated to form a crate in a flat, knocked-down condition.

In forming the crate to its flat, knocked-down position illustrated in Fig. 2, the bottom securing flap 19 at the right hand end of blank 10 (Fig. 1) is first folded upwardly, inwardly and downwardly about adjoining crease 51 to the position illustrated in dotted lines in Fig. 1, whereupon wall and partition forming section 12 is folded as a unit upwardly and inwardly and downwardly about double crease 35. End wall panel 47 is then secured, as by staples or stitches 51, to flap 20, leaving the container in the flat form shown in Fig. 2.

Figure 3:
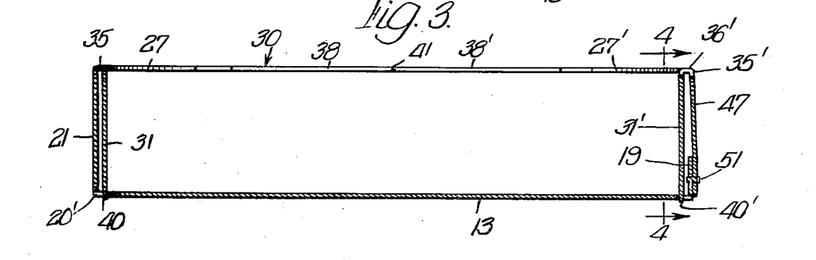
Fig. 3 is a view in longitudinal vertical section through the crate on a line corresponding to line 3—3 of Fig. 2 this view showing the crate in an open-sided, tubular condition, partially erected from the form of Fig. 2.
Figure 4:
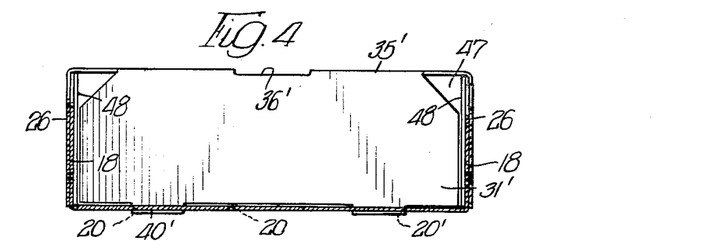
Fig. 4 is a view in vertical transverse section along a line corresponding to line 4—4 of Fig. 3, further illustrating details and relationships of parts when the crate is further locked up.

It is shipped in this condition to the ultimate user. In completing the crate to its erected condition, the flat article is expanded by a compressive force applied to its opposite end margins, represented by end wall hinges 35 and 35'. The container is thus brought to rectangular outline. Inner end wall panels 31, 31' may now be swung downwardly about their respective double creases 35, 35' into 90° relation to bottom panel 13 and the locking feet 40, 40' thereon snapped into bottom locking slots 20'. This leaves the carton in a partially erected, tubular condition illustrated in Fig. 3. Partition panels 38, 38' may next be similarly swung down about crease 41 and their locking feet 44, 44' snapped into bottom slots 16, the flaps 45, 45' trailing and wedging with bottom 13; however, it is desirable to delay this pending completion of the side wall structures of the crate.

To set up the side walls, the sets of end wall flaps 22, 48 are swung inwardly to 90° relation to end wall panels 21, 47, respectively, after which inner side wall panels 18 are swung upwardly about creases 14 to 90° relation to bottom panel 13, externally overlying flaps 22, 48. Outer side wall panels 26 are then swung downwardly 90° to side by side engagement with panels 18.

Figures 5, 6, 7:
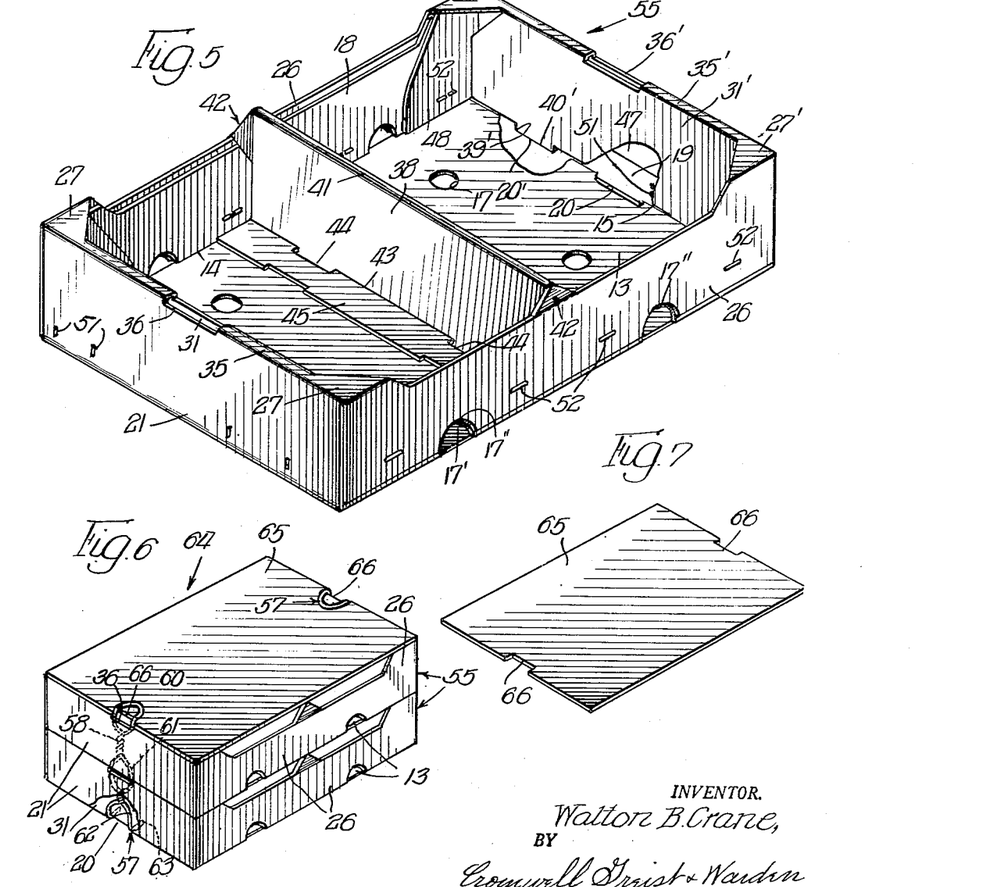
Fig. 5 is a top perspective view illustrating the improved crate in the finally erected and locked condition of its wall and partition parts.
Fig. 6 is a top perspective view, partially broken away, illustrating a shipping unit composed of a pair of the improved crates assembled and held in a compact rigid assembly.
Fig. 7 is a perspective view of a further lid or cover member which may be employed as an element of the unit of Fig. 6.

With the walls and flaps manipulated as described, they are held together by staples or stitches 52 (see Fig. 5) thereby completing the wall structure of the shipping crate, which is generally designated by the reference numeral 55. Partition panels 38, 38' are swung downwardly in opposite directions about their connecting crease 41 and engaged with bottom panel 13, as indicated above, completing the crate (Fig. 5). The flexible flaps 45, 45' on the lower end of panels 38, 38' wipe along bottom 13 as panels 38, 38' are manipulated as described, and act as friction members tending to resist inadvertent displacement of panels 38, 38' from locked position.

The set up carton presents multiple side wall and end wall thicknesses, all substantially reinforced by the lateral and vertical strut action of the center partition. A strong unseamed bottom also adds to the strength of the crate. Upwardly opening slots 36, 36' in the tops of the end walls coact with similar vertically aligned slots 20 at the ends of bottom panel 13 in locking a plurality of the crates 55 together, in a fashion illustrated in Figs. 6, 7, 8 and 9 of the drawings.

Figure 8:
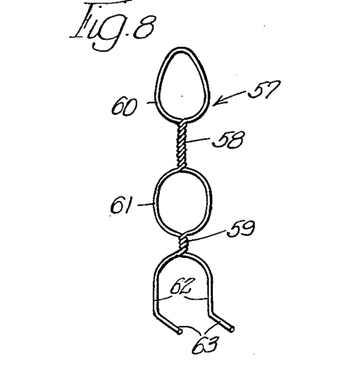
Fig. 8 is a perspective view of a crate aligning and locking device associated with the unit of Fig. 6.

Referring first to Fig. 8, a locking member 57, in accordance with one embodiment of three presented therein, consists of a single elongated length of relatively rigid wire which is first bent in U-shape and the legs successively twisted and/or welded together at 58 and 59 to stiffen the same and to provide upper and intermediate crate aligning and stabilizing loops 60, 61. The lower legs 62 of the wire are formed to provide a bottom bight of inverted U-shape and are bent at 90° to the plane of the loops 60, 61 and bight 62 to afford feet 63. These are engageable beneath the bottom of a lowermost crate 55 of a two-crate stacked unit generally designated 64 in Fig. 6. Crate unit 64 may also include a relatively rigid, corrugated board top closure panel 65 of rectangular outline, Fig. 7, provided with lock accommodating recesses 66 in opposite ends thereof.

In assembling unit 64, one of the wire locking members 57 is inserted upwardly in each of the centermost slots 20 at opposite end margins of the lowermost crate bottom panel 13, the feet 63 underlying the panel. The legs of bight 62 take firm, stable engagement with the ends of slot 20 and between the inner and outer wall end panels, i. e., between panels 31, 47 at one end and panels 21, 31 at the opposite end. Loops 61 extend upwardly through the top end wall slots 36, 36' respectively, engaging the ends of the latter. When the second crate 55 is slipped over the upstanding members 57, half of the respective loops 61 engage in its end bottom slots 20 and the top loops 60 extend upward through its top end wall, thus registering the two stacked crates 55 in vertically aligned relation. Cover panel 65 is now applied, as illustrated in Fig. 6, and loops 60 are bent 90° inwardly and clamped against the same, completing the shipping unit 64. The latter has good longitudinal, lateral and vertical stability, with no need for further wire or other binding provisions, staples, and the like, commonly employed in assembling wooden shipping crates. Members 57 hold the crates securely in place and also function as a quickly usable cover locking device. The contents of the crate unit are well ventilated by apertures in the walls and bottom of the crate, insuring proper circulation of air therein. Units of this sort are prepared for shipment at a fraction of the cost of wooden units.

Figure 9:
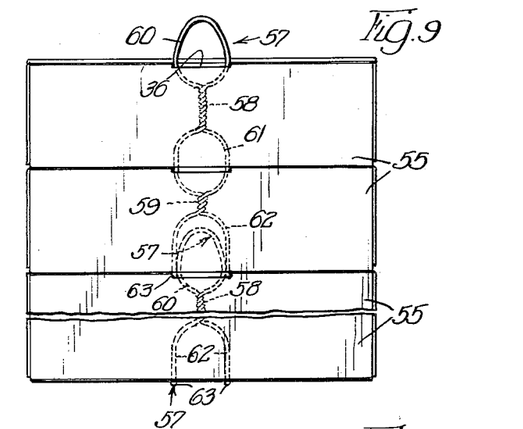
Fig. 9 is a view in end elevation illustrating the manner in which more than one pair of crates may be associated as a unit in accordance with the invention.
Figure 10:
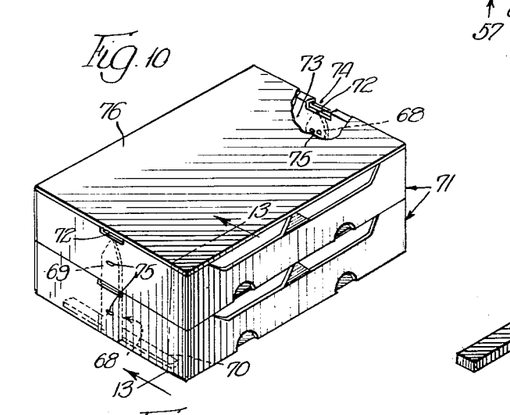
Fig. 10 is a top perspective view, partially broken away, showing an adaptation of the invention employing a modified embodiment of aligning and locking device for a pair of stacked crates, also indicating a slight modification in the crate structure employed in this particular unit.

In the event it is desired to assemble a greater number of crates in a larger unit, as shown in Fig. 9, the upper loop 60 of the locking member 57 of a two crate unit is left upright, the loop 60 then entering into the space between bight legs 62 of a unit thereabove. This registers the compounded units longitudinally and laterally, in the same manner as the crates 55 of an individual crate unit 64 are registered. The uppermost crate may be closed by a cover panel similar to that illustrated in Fig. 7, clamped in place by bending over the uppermost loop 60.

Figure 11:
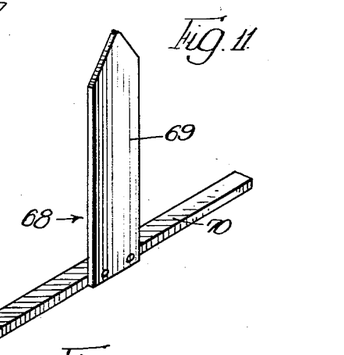
Fig. 11 is a perspective view of a rigid wooden aligning and locking device associated with the unit of Fig. 10.

A modified crate unit is illustrated in Figs. 10-13 inclusive of the drawings; this employs a wooden crate aligning and locking member such as is shown in Fig. 11 and generally designated by the reference numeral 68. Member 68 is of inverted T-shape including a relatively wide and flat upstanding stake 69, pointed at its end, and a transverse bottom cleat 70, to the outer edge of which element 69 is centrally secured, as by nails. In employing lock member 68 it is desirable to make a slight modification in the crate, hence the latter is specially designated 71 in Figs. 10, 12 and 13. This change simply involves an increase in depth of a side of each of the slots 72 formed at the top of the end walls of the crate, which are formed by inner and outer panels 73, 74. The slots are extended downwardly further in inner end wall panel 73, as illustrated clearly in Figs. 10 and 13.

Figure 12:
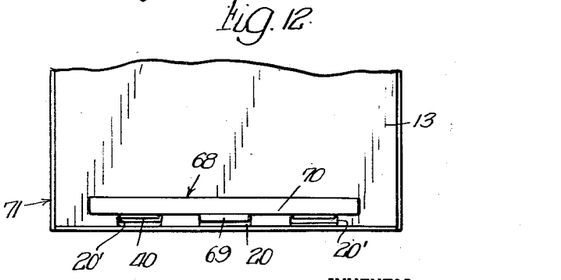
Fig. 12 is a fragmentary bottom plan view of the unit of Fig. 10, showing the relationship of the lowermost crate thereof to the aligning and locking member.

Locking members 68 are applied to a bottom crate 71 in the fashion shown in Figs. 12, the transverse cleats 70 being disposed inwardly to clear the inner end wall locking feet 40, 40' and the upstanding stakes 69 passing upwardly through the center slot 20 in bottom panel 13 and through the respective slots 72 of the end walls. The crate end walls are then secured to stakes 69 by staples 75. Another crate 71 is now slipped downwardly over the upper portion of the thus inserted stake, and is similarly secured thereto, whereby the two crates are properly registered in longitudinal and lateral relation by engagement of stake 69 in the various slots 20, 72.

Figure 13:
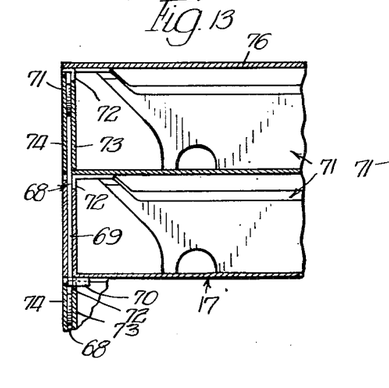
Fig. 13 is a fragmentary view in longitudinal vertical section along a line corresponding to line 13—13 of Fig. 10, further illustrating the manner in which more than a single pair of stacked crates may be compactly assembled in a larger stack, if desired.
Figures 14, 15, 16, 17:
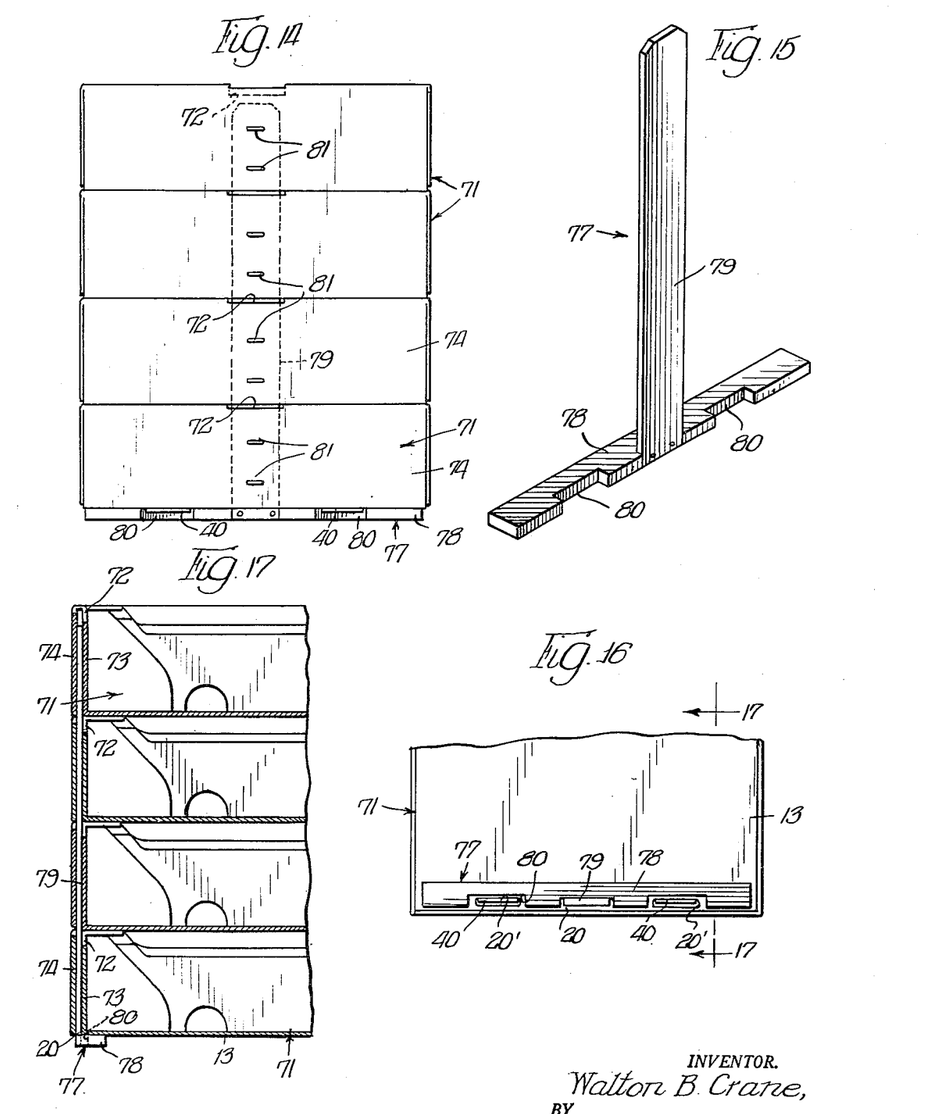
Fig. 14 is an end elevational view of a still further modified adaptation of the invention, generally similar to the form of Figs. 10–13, but relating to the stacking and locking of four crates in a unitary group.
Fig. 15 is a perspective view illustrating a modified type of rigid wooden stacking member or device employed in the unit of Fig. 14.
Fig. 16 is a fragmentary bottom plan view of the last named unit.
Fig. 17 is a fragmentary view in longitudinal vertical section along a line corresponding to line 17—17 of Fig. 16.

In the event that it is desired to secure more than two crates in stacked relation, as illustrated in Fig. 13 of the drawings, the downward enlarging of slot 72 accommodates the bottom or heel portion of stakes 69, at which it is secured to cleat 70, preventing interference of this heel portion with the crate immediately therebeneath. A corrugated board cover panel or lid 76 may be stapled or wire banded to the top crate of any unit.

A still further modified embodiment in a four crate shipping unit is illustrated in Figs. 14-17 of the drawings. In this embodiment, wooden locking member 77 (Fig. 15) is also of inverted T-shaped outline, comprising a transverse cleat 78 which is centrally recessed along one edge to receive an elongated upstanding stake member 79 in flush relation to that edge. Because of this flush relation, the edge referred to is further slotted at 80 on either side of its center point to accommodate the depending locking feet 40 or 40' of the inner end wall panel of the bottom crate 71 of a stack. Stake 79 is of sufficient height to extend upwardly almost the entire height of the assembly of four crates, which are successively secured thereto by staples or stitches 81 as the stack is built up. A lid or cover may be applied, as in the form of Figs. 10–13. Member 78 holds a stack of four crates, which is as many as are ordinarily desired in a produce shipping unit, in laterally and longitudinally correct, rigid register, as described in connection with the embodiment of Figs. 10–13.

Figs. 18–23 illustrate another embodiment of the crate and the stacked crate unit, in which the main objectives have been to simplify the construction; to economize with regard to the amount of corrugated board or like paperboard stock required in making the crates, without loss of strength or rigidity in the crates or stacked unit; and to insure proper spacing of the component panels of the multiple panel end walls to receive without interference the stacking and locking tie members or clips between those wall panels. An improved form of wire locking member or tie clip has also been devised for association with the crates of this improved unit.

Figure 18:
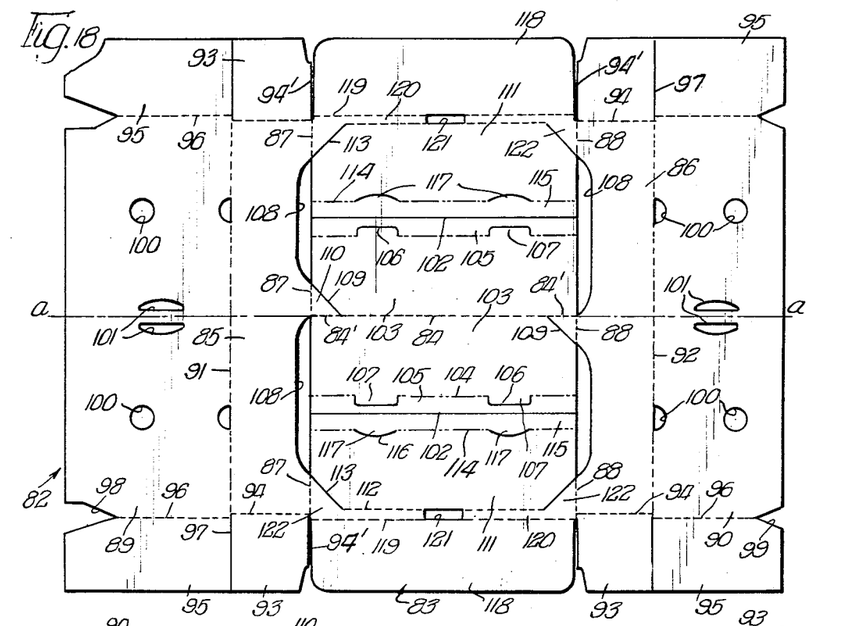
Fig. 18 is a top plan view of a paperboard blank employed in fabricating a modified and simplified embodiment of the container.

The improved blank 82, from which the last described modification is made is illustrated in Fig. 18. It can be seen, by comparing it with the blank 10 of Fig. 1, that a considerable saving of material has been realized in this form, primarily due to the fact that the side walls are of but single ply thickness. Desired rigidity of the completed container is preserved at the end wall structure without materially increasing the amount of stock in the blank.

Blank 82 is entirely symmetric about a horizontal, longitudinally extending medial line a—a; accordingly, for simplicity, corresponding reference numerals will be employed to designate corresponding parts and/or relationships on opposite sides of that medial line.

Such parts include a central partition and end wall forming section, generally designated 83 which is subdivided equally by a longitudinally extending crease 84 coinciding with medial line a—a. Side wall panels 85, 86 on either side of section 83 are hingedly connected thereto by two series of transversely aligned short creases 87, 88, respectively, to be hereinafter referred to; and bottom forming panels 89, 89 are hingedly conjoined to the respective side wall panels 85, 86 by the parallel transversely extending creases 91, 92. Side wall panels 85, 86 are each provided with end flaps 93 at opposite ends thereof, integrally hinged to the respective panels by creases 94, and flaps 93 are separated from the central section 83 by slits or cuts 94' aligned with the respective series of hinging creases 87, 88.

Bottom forming panels 89, 90 are also provided with end wall forming flaps 95, integrally hinged thereto by creases 96 in approximate alignment with creases 94, which end panels 95 are separated from end panels 93 by slits or cuts 97. The side wall and bottom forming panels 85, 86 and 89, 90, respectively, are uncreased between the sets of creases 94, 96 which hinge to them their respective end flaps 93, 95. V-shaped clearance notches 98, 99 of substantial size are formed at the outer termini of the respective flap hinging creases 96, and ventilating openings 100 are formed in the body of bottom panels 89, 90 and adjacent their hinging creases 91, 92. Each of the bottom panels is also provided with a partition latching slot 101, on either side of the medial line a—a; these slots extend in parallelism with the line a—a and the pairs of slots 101 on the respective panels 89, 90 are so located that they are in laterally spaced relation to one another when the container is completed.

Central partition and end wall forming section 83 is, as stated above, medially subdivided by the crease 84 and is provided with a longitudinally extending slit 102 on either side thereof. Slits 102 define the free edges of flap-bearing cross partition panels 103 which are integrally hinged to one another by crease 84. Each panel 103 is provided with a longitudinally extending cut score or crease 104 in spaced relation to its free edge at slit 102, thus to afford bottom wedging flaps 105, and a pair of U-shaped slits 106, whose legs terminate at crease 104, outline partition locking feet or lugs 107 as integral extensions of the respective cross partition panels 103.

Partition panels 103 are separated from side wall panels 85, 86 by transversely elongated slots 108 extending into the side wall panels, and by inclined slits 109 which extend from the inner ends of these slots to the medial hinging crease 84 of the panels 103. In this form of the invention each of the partition panels 103 is thus slitted away adjacent only one side margin thereof, the two slits 109 being on opposite sides of the hinging crease 84. The side wall hinge crease 87 adjacent one end of medial line a—a thus coacts with a slit 109 and an end extension 84' of hinge crease 84 to define a triangle corner web 110 to which one panel 103 is hinged, and the corresponding, opposite hinge crease 88 coacts with the other slit 109 and the opposite extension 84' of crease 84 to define another similar but staggered corner web 110 to which the other partition panel 103 is hinged.

Slits 102 separate each of the flap bearing cross partition panels 103 from an inner end wall panel 111, which is hinged to the remainder of section 83 by means of a longitudinally extending crease 112. Forty five degree inclined slits 113 extend outwardly from each end of this crease to termini of the side wall slots 108. A longitudinally extending cut score 114 defines a bendable flap 115 on the free edge of each panel 111, and this cut score is interrupted by a pair of laterally spaced arcuate, outwardly convex slits 116. These slits define outwardly projecting end wall panel spacing tongues 117 whose function is hereinafter referred to.

Finally, an outer end wall flap 118 is provided at each end of section 83 between the slits 94', being integrally hinged by a crease 119 which in approximate alignment with the flap hinging creases 94, 96. However, crease 119 is spaced substantially outwardly from the crease hinging the inner wall panels 111, so as to define a connecting zone 120 which is of substantial width. A somewhat elongated locking slot 121 is formed at the center of this zone, being of width equal to the latter. Zone 120 merges at its opposite ends into triangular corner webs 122 which are outlined by the angular slits 113 and the respective creases 87, 88 by which side wall panels 85, 86 are hinged to section 83.

Figure 19:
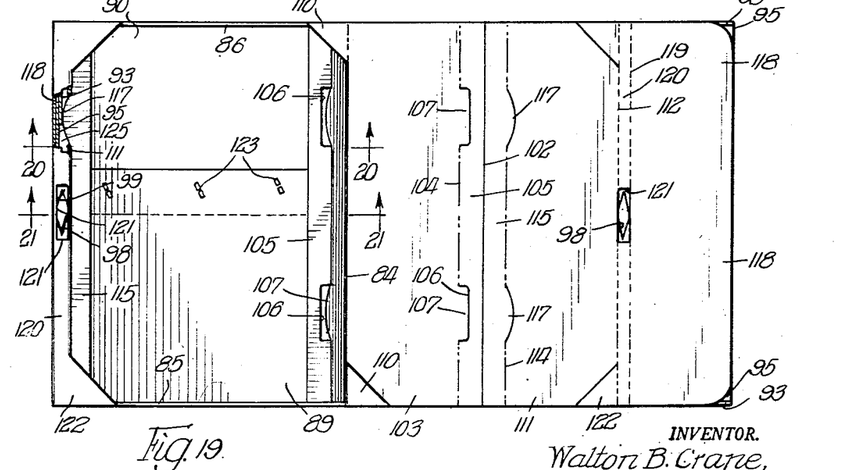
Fig. 19 is a top plan view, partially broken away, of a container formed from the blank of Fig. 18, in a partially completed condition thereof.

In completing the crate, the blank 82 of Fig. 18 is formed to a flat, knocked-down tubular condition by folding the same on hinge creases which adjoin its side wall panels 85, 86, rather than about end wall hinge creases, as in the blank 10 of Fig. 1. Bottom forming panel 89 and side wall panel 85 are folded as a unit, together with their end flaps or members, about the line of hinge creases 87 into superposed relation to center section 83. Bottom forming panel 90 and its end members 95 are then folded about hinge crease 92 into overlapped relation to the other bottom forming panel 89, and the two bottom panels are then secured together by metal stitches or staples 123 (Fig. 19). The crate may be stored or shipped to a final assembly point in this flat, knock-down condition.

The thus formed flat tube is brought to a rectangular cross sectional outline by applying compressive force to its opposed side edges, represented by crease 92 and the series of creases 87. The right hand half of Fig. 19 shows the crate as partially erected to such a rectangular tubular conditions, and the left hand portion of the figure shows the tube after certain erecting manipulations of its panels have been performed.

Figures 20, 21, 22:
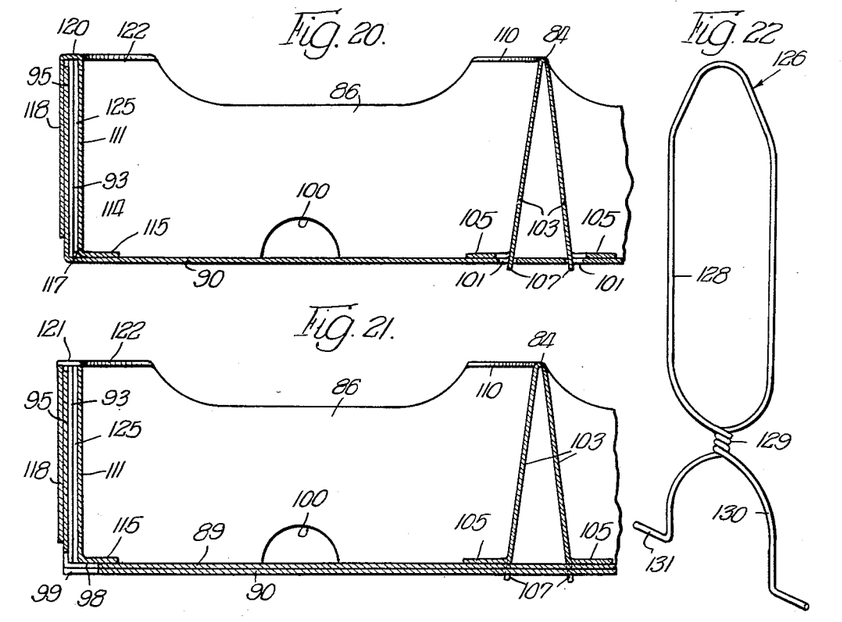
Figs. 20 and 21 are, respectively, fragmentary sectional views of the container of Fig. 19, in somewhat enlarged scale along lines 20—20 and 21—21 of Fig. 19.
Fig. 22 is a perspective view illustrating, in still further enlarged scale, an adaptation of a wire stacking and locking tie or clip which may be used to hold crates as shown in any of the figures in stacked relation.
Figure 23:
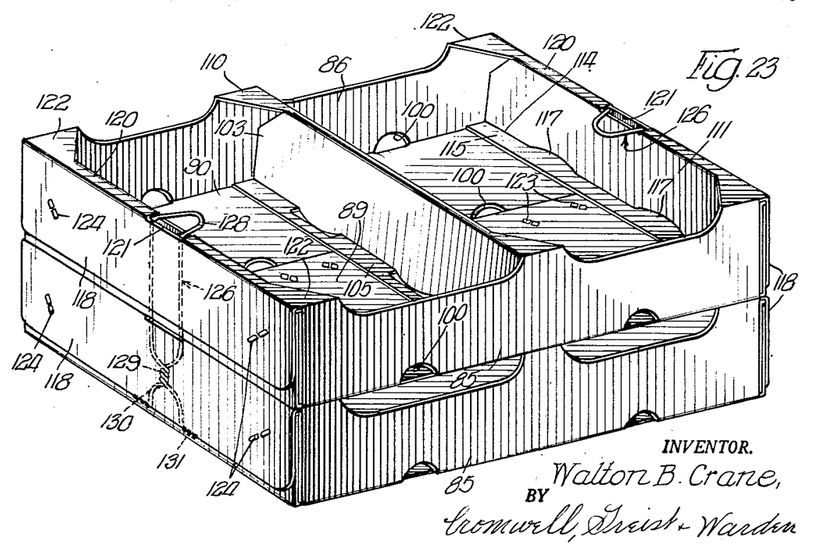
Fig. 23 is a top perspective view of a stack of the crates shown in Figs. 18–21, held in such relation.

In finishing the set-up of the crate, cross partition panels 103 are swung downwardly about medial crease 84 toward upstanding relation to the bottom constituted by overlapped and stapled panels 89, 90. As panels 103 approach a vertical relation to the bottom, their marginal flaps 105 engage the latter and are bent outwardly with relation to and about flap hinging creases 104, which then wedges frictionally along the inner surface of the bottom. When a predetermined position is reached, the feet 107 on panels 103 snap into the locking slots 101 in the bottom, thus holding the panels in erected condition to constitute a two wall cross partition, as illustrated in Figs. 20, 21 and 23, and to the left of Fig. 19. This preliminary erection and locking of the cross partition holds the container in rectangular box-like shape to facilitate performance of succeeding manipulations.

The end flaps 93 on opposite ends of the side wall panels 85, 86 are now folded inwardly to right angular relation to those panels, after which the overlapped flaps 95 at each end of the stapled bottom panels 89, 90 are folded upwardly at 90° to the latter. The outer end wall panels 118 are then folded downwardly into side by side relation to those flaps, completing a smooth external end surface for the container. Stitches or staples 124 hold the thus assembled parts together.

Inner end wall panels 111 of section 83 are next swung inwardly and downwardly about their respective hinge creases 112 to a vertical relationship to the container bottom, as depicted in Figs. 19, 20 and 23. As panels 111 approach this position, in which they internally enclose end wall flaps and members 93, 95, the terminal flaps 115 on their free edges engages the container bottom and are deflected about their hinging creases 114, the flaps swinging to a position substantially parallel with the container bottom.

The end wall spacing tongues 117, formed in the blank by the arcuate slits 116, remain in the plane of flaps 115 and, as inner end wall panels 111 approach vertical position, these tongues take outward edge abutment with the side end flaps 93. Since the tongues now extend outwardly from inner end wall panels 111 (see Figs. 19 and 20), their abutting engagement with flaps 93 positively locates the inner end wall panels a predetermined distance inwardly of the remainder of the end wall structure and preserves a space 126 within each of the end walls for the reception of a locking or tie clip or equivalent member. Such a member is illustrated in Fig. 22 and generally designated 126. The tie clips 126 are unfailingly received in the spaces 126 at either end of the crate, tongues 117 insuring against interference with these locking members by any of the end wall panels, and also bracing the end walls to a substantial degree.

Tie members 126 are, like the clips 56 shown in Fig. 8, fabricated of flexible wire stock; however, in this form, they are bent to provide a single, vertically elongated upper loop 128, and a connecting welded or twisted portion 129 joins the loop to a lower leg portion 130 of inverted U-shape outline. The legs of portion 130 are bent outwardly in the plane of the clip at 131 to horizontal, transversely aligned position.

A stack of the improved crates in accordance with the last described embodiment is illustrated in Fig. 23. In assembling it the wire tie clips 126 are inserted upwardly through the end apertures in the lowermost crate bottom, which are outlined by the coacting notches 98, 99 of the superposed or overlapped bottom forming panels 89, 89 (see Fig. 19). Clip loop 128 passes upwardly through the space 126 between the inner and outer end wall panels 111, 118, through slot 121 at the top hinge zone 120, and through the corresponding aperture and slot in a crate which is superposed thereabove. The clips engage ends and sides of these openings to preserve lateral and longitudinal register of the stacked crates, as described with reference to preceding forms and as illustrated in Fig. 23.

The upper ends of loops 128 project above the end walls of the topmost crate and may be deflected inwardly as shown in Fig. 23 to register the crates in a vertically aligned, neatly stacked unit, which is held in this unitary relationship without likelihood of relative longitudinal or lateral horizontal shifting, or vertical displacement. If desired, a cover may be applied to the topmost crate of the unit and held thereto by the inturned ends of loops 128, in the same manner as in Fig. 10 of the drawings.

The crates have the advantage that, without sacrifice of rigidity and stability, they may be fabricated of a blank 82 of minimum size, in an operation involving a minimum loss of material at died out areas of the blank. This, also avoids extensive stripping. The crates are readily and quickly erected from a flat, knocked-down condition, in which they may be shipped or stored, to the fully erected condition thereof. So erected, they have strength and rigidity comparable to that of a wooden shipping lug at a fraction of its cost, and they may be reused repeatedly without appreciable loss of these qualities.

The very important contribution of the cross partition member of the crate, in either embodiment thereof, in rigidifying the crate as a whole deserves a special note. These cross partitions are even more valuable in their functions as load supports and stiffening and bracing means than they are as divider or partition members subdividing the interior of the crates, and this is especially so when it is considered that they are usually used under atmospheric conditions very unfavorable to the preservation of the strength of a paperboard article. For example, the crates are commonly employed in great numbers in the shipment of fruit or produce in refrigerated railroad cars, thus subject to high humidity as well as physical compression and impact.

Under these conditions, the cross partitions strongly brace the crate by rigidly tying its upstanding side walls in parallel relation, so as to be proof against outward bulge or collapse or inward crushing under load or lateral impact. They act as columns sustaining vertical load and, as is particularly the case in the adaptation of the invention shown in Figs. 18–23, they distribute the load supporting strength in six distinct areas, represented by the crate corners and the triangular webs 110 at the crate center. Even in the event that the cross partition panels do not have direct edge abutment at their bottoms with the bottom of the crate, and are spaced somewhat above the bottom, the weight of a superposed crate will bring about such engagement, causing the transversely extending length of the cross partition panel to act as a further load supporting strut.

Again in connection with the form of Figs. 18–23, the disposition of the triangular connecting webs 110 at the ends of the panel hinging crease, so that they lie on opposite sides of the partition, imparts a strong torsional resistance to the crate as a whole when it is properly stapled together. A force couple is created which strongly combats any tendency to twist about a vertical axis through the center of the crease, and the end and side walls of the crate are thus further stabilized and stiffened.

I claim:

1. A paperboard crate for the shipment of produce and the like comprising a bottom forming member, upstanding side wall panels integrally connected by creases to said bottom forming member and end wall structures connected to said side wall panels and to said bottom member, said end wall structures each comprising an upturned flap integrally hinged to said bottom member, a depending outer end wall panel in external covering relation to said flap, an inner end wall panel integrally hinged to the upper edge of said outer end wall panel and depending inwardly of the container, in relation to said end wall structure, said inner end wall panel being provided with a terminal flap integrally hinged thereto adjacent the lower end thereof, which flap is bendable inwardly about the hinge thereof upon wedging engagement with said bottom member, said flap having an integral tongue at the hinge line thereof projecting outwardly for abutting engagement with said upturned end wall flap to maintain predetermined spacing of said inner and outer end wall panels.

2. A paperboard crate for the shipment of produce and the like comprising a bottom member, upstanding side wall panels integrally connected by creases to a bottom forming member, and end wall structures connected to said side panels and to said bottom member, said end wall structures each comprising an upturned flap integrally hinged to said bottom member, a depending outer end wall panel in external covering relation to said flap, an inner end wall panel integrally hinged to said outer panel and depending inwardly of the container, in relation to said end wall structure, said inner end wall panel being provided with a terminal flap integrally hinged thereto adjacent the lower end thereof, which flap is bendable inwardly about the hinge thereof upon wedging engagement with said bottom member, said flap having an integral tongue projecting outwardly adjacent the hinge line thereof for abutting engagement with said end wall flap to maintain predetermined spacing of said inner and outer end wall panels, said end wall structure being provided with an elongated slot in the integral hinge connection of its inner and outer panels and said bottom member being provided with an aperture in vertical alignment with said slot.

3. A paperboard crate comprising a bottom, side and end walls connected to said bottom in upstanding relation thereto, and an upstanding partition subdividing the interior of said crate, said partition comprising a pair of panels integrally hinged to one another by a crease at the top of the partition, said panels being of greater depth than the depth of the side and end walls and extending from the top edge of the crate to the bottom thereof, and means connecting said partition to said side walls comprising a web element at each end of said top partition crease and an extension at each end of said crease connecting each of said panels to a web element, said web elements each being integrally connected to the adjoining side wall along a crease line coinciding with the top edge of the crate and being confined in their location to the respective opposite sides of said crease.

4. A paperboard crate comprising a bottom, side and end walls connected to said bottom in upstanding relation thereto, and an upstanding partition subdividing the interior of said crate, said partition comprising a pair of panels integrally hinged to one another by a crease at the top of the partition, and means connecting said partition to said side walls comprising a horizontally extending triangular web element at each end of said top partition crease and an outward extension at each end of said crease connecting each of said panels to a web element, said web elements each being integrally connected to the adjacent side wall along a crease line coinciding with the top edge of the crate and being confined in their location to the respective opposite sides of said crease.

5. A paperboard crate comprising a bottom, side and end walls connected to said bottom in upstanding relation thereto, and an upstanding partition subdividing the interior of said crate, said partition comprising a pair of panels integrally hinged to one another by a crease at the top of the partition, and means connecting said partition to said side walls comprising a horizontally extending web element at each end of said top partition crease and an extension at each end of said crease connecting each of said panels to a web element, said web elements being integrally connected to said side walls along crease lines coinciding with the top edge of said crate and being confined in their location to the respective opposite sides of said crease, each of said upstanding partition panels being provided with a marginal flap integrally hinged to the bottom thereof and in frictional engagement with said bottom.

6. A crate in accordance with claim 5 in which said end walls comprise inner and outer panels hinged at the top of said walls and separated by cuts from said respective partition panels.

7. A paperboard crate comprising a bottom, side and end walls connected to said bottom in upstanding relation thereto, and an upstanding partition subdividing the interior of said crate, said partition comprising a pair of panels integrally hinged to one another by a crease at the top of the partition, and means connecting said partition to said side walls comprising a horizontally extending web element at each end of said top partition crease and an extension of said crease connecting each of said panels to a web element, said web elements being integrally connected to said side walls along crease lines coinciding with the top edge of the crate and being confined in their location to the respective opposite sides of said creases, each of said panels being provided with a flap integrally hinged to the bottom thereof and in frictional engagement with said bottom, said partition panels each having downwardly projecting tongues located inwardly of said flaps which are interlocked in spaced apertures in said bottom.

8. A generally rectangular container forming blank cut and scored to provide panels which, when folded and set up, constitute an open tray-like container, said blank being divided by spaced parallel hinge forming score lines, which extend in a direction transversely of the blank, into a top forming section, integral side wall forming panels hingedly connected along opposite side edges of said top forming section, and bottom wall forming panels integrally hinged along the opposite side edges of said side wall forming panels, and said blank having end wall forming panels extending at the opposite ends of said top forming section and said bottom and side wall forming panels, which end wall forming panels are separated therefrom by parallel hinge forming crease lines extending in the direction longitudinally of the blank and offset relative to each other, said top forming section being subdivided by longitudinal and transverse cutting lines to provide a pair of hingedly connected center partition forming panels and inner end wall forming panels at opposite ends thereof which inner end wall forming panels are foldable inwardly, relative to the first mentioned end wall panels which extend from the ends of said top forming section, along hinge forming crease lines spaced inwardly of the hinge forming crease lines separating said first mentioned end wall panels from said top forming section, said inner end wall forming panels and said center partition forming panels having relatively narrow integrally hinged flap members at the free edges thereof for wedging engagement with the bottom when the container is erected and said center partition forming panels being hingedly connected at opposite ends to the adjoining side wall forming panels by triangular web portions which are on opposite sides of the hinge line connecting the center partition forming panels.

9. A paperboard crate for the shipment of produce and the like comprising a bottom forming member, upstanding side wall panels integrally connected by creases to said bottom forming member and end wall structures connected to said side wall panels and to said bottom forming member, said end wall structures each comprising depending outer and inner end wall panels integrally connected to each other at the upper margin of said end wall structure along spaced parallel hinge lines, said inner end wall panel being provided with a terminal flap integrally hinged thereto adjacent the lower end thereof, which flap is bendable inwardly about the hinge thereof into wedging engagement with said bottom member, said flap having an integral tongue cut from the inner end wall and projecting outwardly at the hinge line of said terminal flap with said inner end wall panel above the bottom wall in the direction toward the outer end wall panel and opposite the direction in which said flap extends for abutting engagement of the terminal edge thereof with the remainder of said end wall structure to maintain predetermined spacing between said inner and outer end wall panels.

10. A paperboard crate for the shipment of produce and the like comprising a bottom member, upstanding side wall panels integrally connected by creases to a bottom forming member and end wall structures connected to said side wall panels and to said bottom member, said end wall structures each comprising spaced depending outer and inner end wall panels integrally hinged to each other at the upper margin of said end wall structure, said inner end wall panels being provided with a terminal flap integrally hinged thereto adjacent the lower end thereof, which flap is bendable inwardly about the hinge thereof upon wedging engagement with said bottom member, said flap having an integral tongue at the hinge line thereof projecting outwardly above the bottom wall toward the outer end wall panel in a direction opposite to said terminal flap for abutting engagement of the terminal edge thereof with the remainder of said end wall structure to maintain predetermined spacing between said inner and outer end wall panels, said end wall structure being provided with an elongated slot in the integral hinge connection of its inner and outer panels and said bottom member being provided with an aperture adjacent the end thereof which is in vertical alignment with said slot and the space between said inner and outer end wall panels.

11. A paperboard crate having a bottom and a multiple panel end wall structure comprising laterally spaced inner and outer panels integrally connected by a top marginal crease, said inner panel being provided with a terminal flap integrally hinged thereto adjacent the lower ends thereof, which flap is bent inwardly about its hinge by wedging engagement with said bottom, said flap having an integral tongue projecting outwardly at the hinge line thereof above the bottom wall in the direction opposite to the direction in which the flap extends with the edge thereof in abutting engagement with the remainder of said end wall structure to maintain predetermined spacing of said inner and outer end panels, said end wall structure being provided with a slot at the integral connection of said inner and outer panels and said bottom being provided with an aperture in vertical alignment with said slot.

12. A crate comprising a rectangular bottom having upstanding side wall panels integrally hinged to opposite side margins thereof and upstanding outer end wall panels connected to opposite ends thereof by pairs of corner webs, inner end wall panels integrally connected to said outer end wall panels by hinges extending between the webs of said respective pairs, said hinges being spaced from each other to define a relatively narrow top wall section at each end of the crate, each of said top wall sections having a central portion thereof cut out to provide an elongated transverse slot extending substantially the full width of said section and said bottom having transverse slots at each end thereof in vertical alignment with the slots in the top end wall sections, said respective inner and outer end wall panels extending vertically in spaced relation on opposite sides of said respective sets of vertically aligned slots, spacing tongues at the bottom edge of said inner end wall panel extending in a horizontal plane above the bottom and between said end wall panels for holding said end wall panels in spaced relation, and an upstanding two panel transverse partition integrally connected at its ends to mid points of the upper margins of said side wall panels by diagonally opposite strut-like gusset members extending in the same plane as said top end wall sections, the panels of said transverse partition being integrally connected along the top edges thereof and being of greater depth than the depth of said side and end walls and having downwardly projecting portions on their bottom edges engaging in apertures in said bottom member to position the bottom edges of said panels in spaced relation.

References Cited in the file of this patent

UNITED STATES PATENTS

| | | |
|---|---|---|
| 335,684 | Clark | Feb. 9, 1886 |
| 688,421 | Keys | Dec. 10, 1901 |
| 1,734,424 | Fitzgerald | Nov. 5, 1929 |
| 1,739,962 | Gerrard | Dec. 17, 1929 |
| 2,076,844 | Holmes | Apr. 13, 1937 |
| 2,130,377 | Bueschel | Sept. 20, 1938 |
| 2,274,714 | Levkoff | Mar. 2, 1942 |
| 2,346,206 | Broderick | Apr. 11, 1944 |
| 2,545,803 | Bergstein | Mar. 20, 1951 |
| 2,579,760 | Saidel | Dec. 25, 1951 |
| 2,594,628 | Evans | Apr. 29, 1952 |
| 2,640,589 | Foster | June 2, 1953 |
| 2,681,174 | Bergstein | June 15, 1954 |

FOREIGN PATENTS

| | | |
|---|---|---|
| 649,414 | Great Britain | Jan. 24, 1951 |